(12) United States Patent
Howell, Sr.

(10) Patent No.: US 6,447,032 B1
(45) Date of Patent: Sep. 10, 2002

(54) TOTE AND BRUSH GUARD ATTACHMENT

(76) Inventor: Raymond L. Howell, Sr., 1591 Bush Rd., La Crescent, MN (US) 55947

( * ) Notice: Subject to any disclaimer, the term of this patent is extended or adjusted under 35 U.S.C. 154(b) by 0 days.

(21) Appl. No.: 09/930,088

(22) Filed: Aug. 15, 2001

Related U.S. Application Data
(60) Provisional application No. 60/230,753, filed on Sep. 7, 2000.

(51) Int. Cl.[7] .............................................. B60R 19/52
(52) U.S. Cl. ..................... 293/115; 293/117; 224/489; 224/490; 211/59.2
(58) Field of Search ................................ 293/115, 117, 293/1.1; 211/59.2; 224/489, 490, 281; 248/291.1; 280/18

(56) References Cited

U.S. PATENT DOCUMENTS

| | | | | |
|---|---|---|---|---|
| 2,880,016 A | * | 3/1959 | Peterson ..................... | 293/115 |
| 3,282,368 A | * | 11/1966 | Pittera ......................... | 293/115 |
| 3,287,027 A | * | 11/1966 | Schuckman ................. | 293/115 |
| 3,847,436 A | * | 11/1974 | Reid ........................ | 248/291.1 |
| 4,099,760 A | * | 7/1978 | Mascotte et al. ............ | 293/115 |
| 5,062,675 A | * | 11/1991 | Rhoden et al. ............... | 296/1.1 |
| 5,067,760 A | * | 11/1991 | Moore et al. ................ | 293/115 |
| 5,224,636 A | * | 7/1993 | Bounds ....................... | 224/281 |
| 5,326,142 A | * | 7/1994 | Dodds et al. ................ | 293/115 |
| 5,636,885 A | * | 6/1997 | Hummel ...................... | 293/115 |
| 5,683,128 A | * | 11/1997 | Heyns ......................... | 293/115 |
| 5,695,228 A | * | 12/1997 | Storer ......................... | 293/115 |
| 6,152,504 A | * | 11/2000 | Dickson et al. ............. | 293/115 |
| 6,276,698 B1 | * | 8/2001 | Calandra ...................... | 280/18 |
| 6,290,271 B1 | * | 9/2001 | Geisler ........................ | 293/115 |
| 6,315,338 B1 | * | 11/2001 | Schneider et al. .......... | 293/115 |
| 2001/0024042 A1 | * | 9/2001 | Usui ........................... | 293/115 |

* cited by examiner

*Primary Examiner*—Ken Patel
(74) *Attorney, Agent, or Firm*—M. Paul Hendrickson

(57) ABSTRACT

A brush guard attachment equipped with a centrally disposed, forwardly disposed pivotally mounted tote rack mounted to a front end of a vehicle protects the vehicle front end against brush damage. The attachment protects the vehicle against impacting damage when the tote rack is used in a toting position. The tote rack is positioned forwardly from protective brush rails and pivots from a pair of projecting vertical support members to a toting position when in use and non-toting position when not in use.

11 Claims, 5 Drawing Sheets

US 6,447,032 B1

TOTE AND BRUSH GUARD ATTACHMENT

This application is a non-provisional application of earlier filed provisional application No. 60/230,753 entitled "Tote and Brush Guard Attachment", filed on behalf of Raymond Howell Sr. on Sep. 7, 2000.

FIELD OF THE INVENTION

The present invention relates to a vehicular protective accessory and more particularly to a brush guard attachment equipped with a toting rack.

BACKGROUND OF THE INVENTION

Numerous luggage or tote racks for attachment to a vehicular front end or rear end have been proposed. Pivotally mounted racks equipped with chains to maintain the rack in a horizontally disposed toting position have been proposed. The chain also serves to retain the rack in an upright position when not in use. A toting platform embodying these chain retaining characteristics and adapted for mounting onto a snowplow frame is disclosed by U.S. Pat. No. 5,467,910 to Ritter et al. A grill and brush guard fitted with a utility rack pivotally mounted to a vehicular front end with rack stops which raises or lowers as an entire brush guard or tote rack unit is disclosed by U.S. Pat. No. 4,099,760 to Moseotte et al. A carrier attachment with a pivotally mounted platform for attachment to a vehicular rear end is disclosed in U.S. Pat. No. 5,092,503 to Cocks. Similarly, luggage carriers are disclosed in British patent specification 266,898; French Patent No, 557,139; and Belgium Patent No. 565,198. Another vehicular carrier apparatus for fixedly mounting to a vehicular front end is disclosed by U.S. Pat. No. 4,989,765 to Huehner.

Unfortunately, none of the proposed for vehicular carrier attachments or brush protectors provide adequate vehicular protection against brush damage when used to tote objects. The proposed attachments either serve as a tote rack when placed in a toting position and/or a brush protector when placed in the untoting or upright position. Insufficient protection to the vehicular front end arises when the rack is placed in a toting position which in turn can result in substantial brush damage to the vehicle.

SUMMARY OF THE INVENTION

The present invention provides a vehicular front-end toting attachment which serves as a vehicle brush guard even when positioned at a toting position. This attachment effectively protects a vehicular front end against brush and other impacting objects while transporting materials such as game kill in wooded areas. The attachment includes a pair of laterally disposed vertical support members; a protective brush rail transversely secured to the support members so as to afford guarding protection to vehicular front end against impacting objects; and a centrally disposed tote rack pivotally mounted between the support members.

The lower portion of the vertical support members may be appropriately contoured with an inner surface mating to an external vehicular bumper surface and particularly contoured for mating onto a top bumper rail surface. Projecting inwardly from a bottom region of each of the vertical support members is a detachable mounting means for mounting the vertical support members to a vehicular frame. The detachable mounting means firmly anchors the support members to the vehicle while also serving to maintain the support members and brush guard rail in a protective position.

The tote rack is centrally disposed within the attachment leaving the outwardly disposed regions protected by a protective brush guard rail. The rack is pivotally mounted along a bottom margin of the support members. The support members are equipped with a rack stop for maintaining the tote rack in the toting position and restraining means such as pins for restraining the tote rack in an upright position when the tote rack is not utilized for toting. When positioned in the upright position the tote rack offers additional protection to the vehicular front end against brush damage.

The brush rail may be of a U-shaped or channeled configuration designed to circumvent a vehicular front end and front fender side panels. The protective top brush rail is supportively anchored and connected to the support members. The brush rail protectively extends in a circuitous pattern about the front end of the vehicular front end so as to protect the front end from brush damage, including the front fender panels, grill and headlights. The brush rail includes a rearwardly positioned top brush rail section and a forwardly bottom brush rail section welded together, both of which bridge between the support members and proliferate along the face of the vehicular front end and peripherally wrap around the cornered edges of the front fenders. When it is desired to utilize the tote rack, a retaining pin may be removed so as to allow the vertically retained tote rack to pivotally drop to a toting position.

The bottom brush rail section compliments the protective features of the top rail section. The bottom rail section flushly rests against the top bumper rail and is interconnectively anchored to the vertical support members in a lateral and horizontally disposed relationship to the top brush rail. The bottom and top brush rails contribute structural support to the vertical support members which in turn provide the vehicular mount for the accessory. A bisecting rail guard extending outwardly from the support members and generally following the planar curvature of the top rail and bottom rail to its intersect with the brush rail provides added protection against brush damage.

DETAILED DESCRIPTION OF THE DRAWINGS

Figure 1:
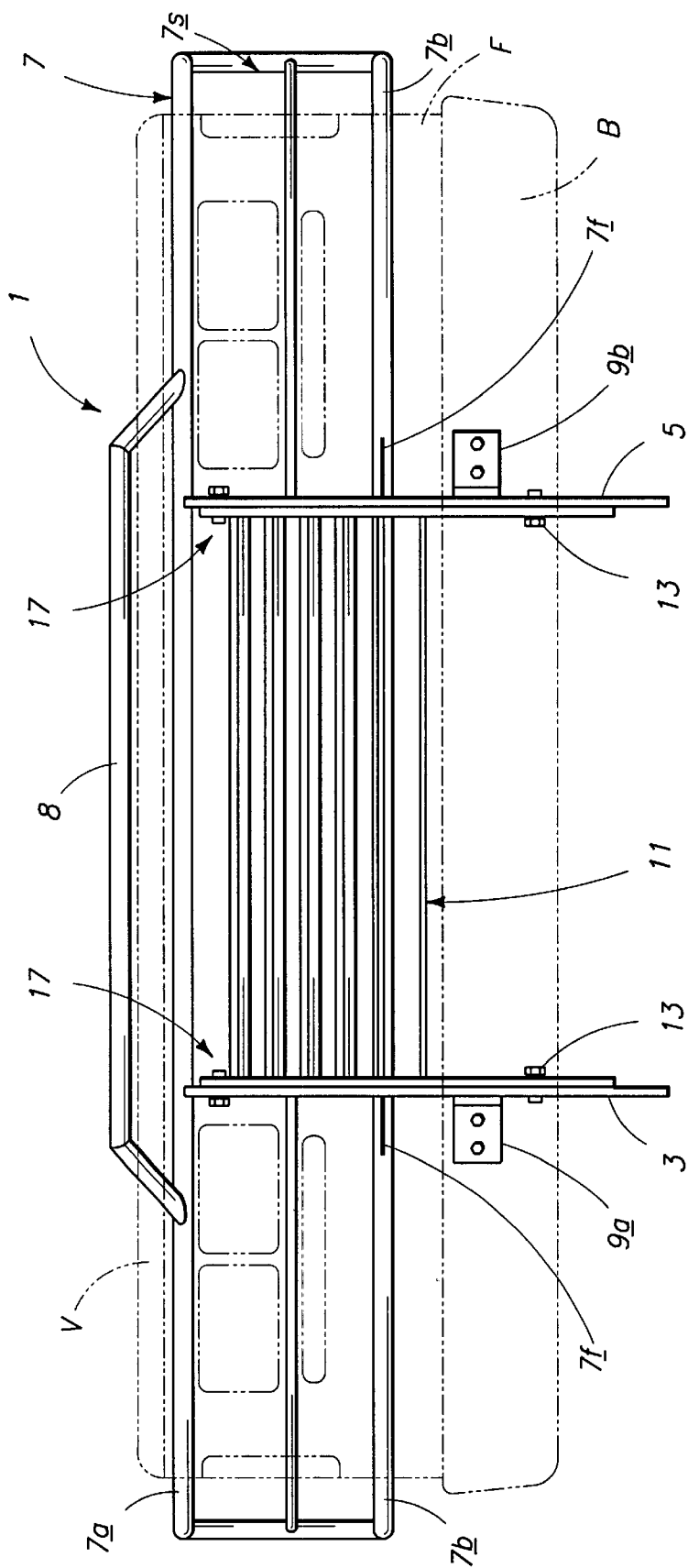
FIG. 1 is a front view of a tote rack positioned in an upright non-toting position and mounted to a front end of a vehicle.
Figure 2:
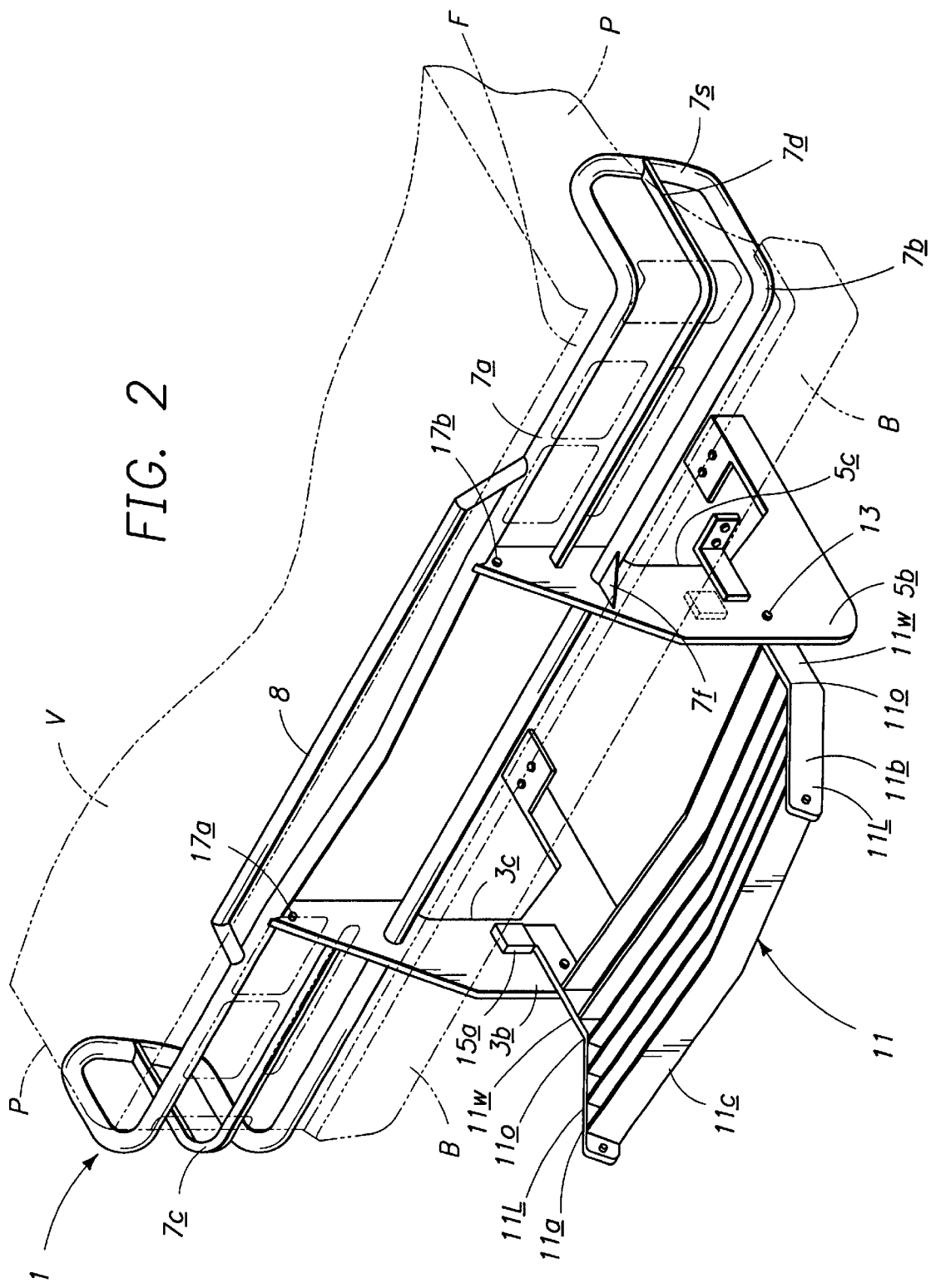
FIG. 2 is a perspective view of the FIG. 1 tote rack positioned in a toting position.
Figure 3:
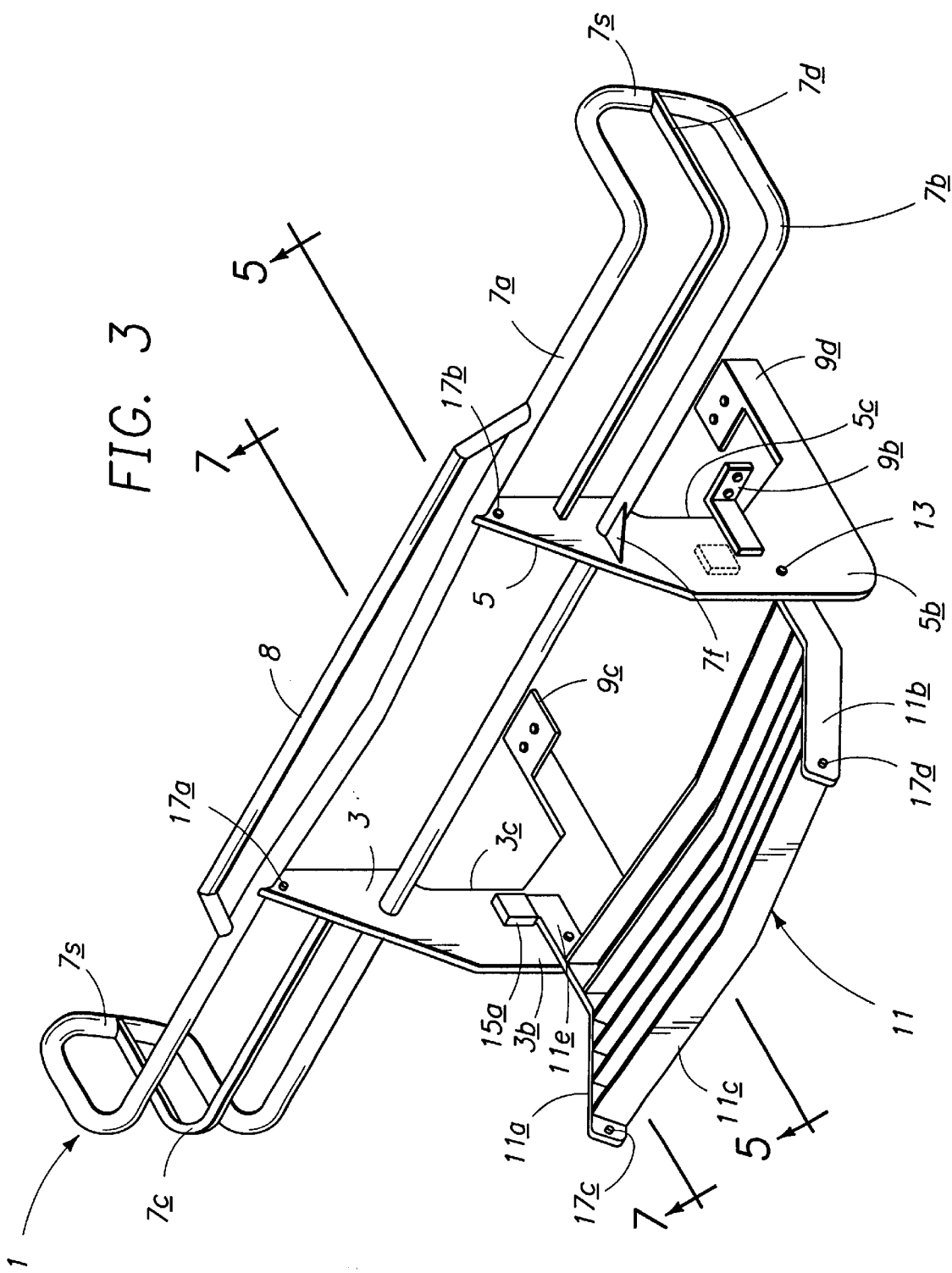
FIG. 3 is a view of the tote rack shown in FIG. 1 detached from to the vehicle.
Figure 4:
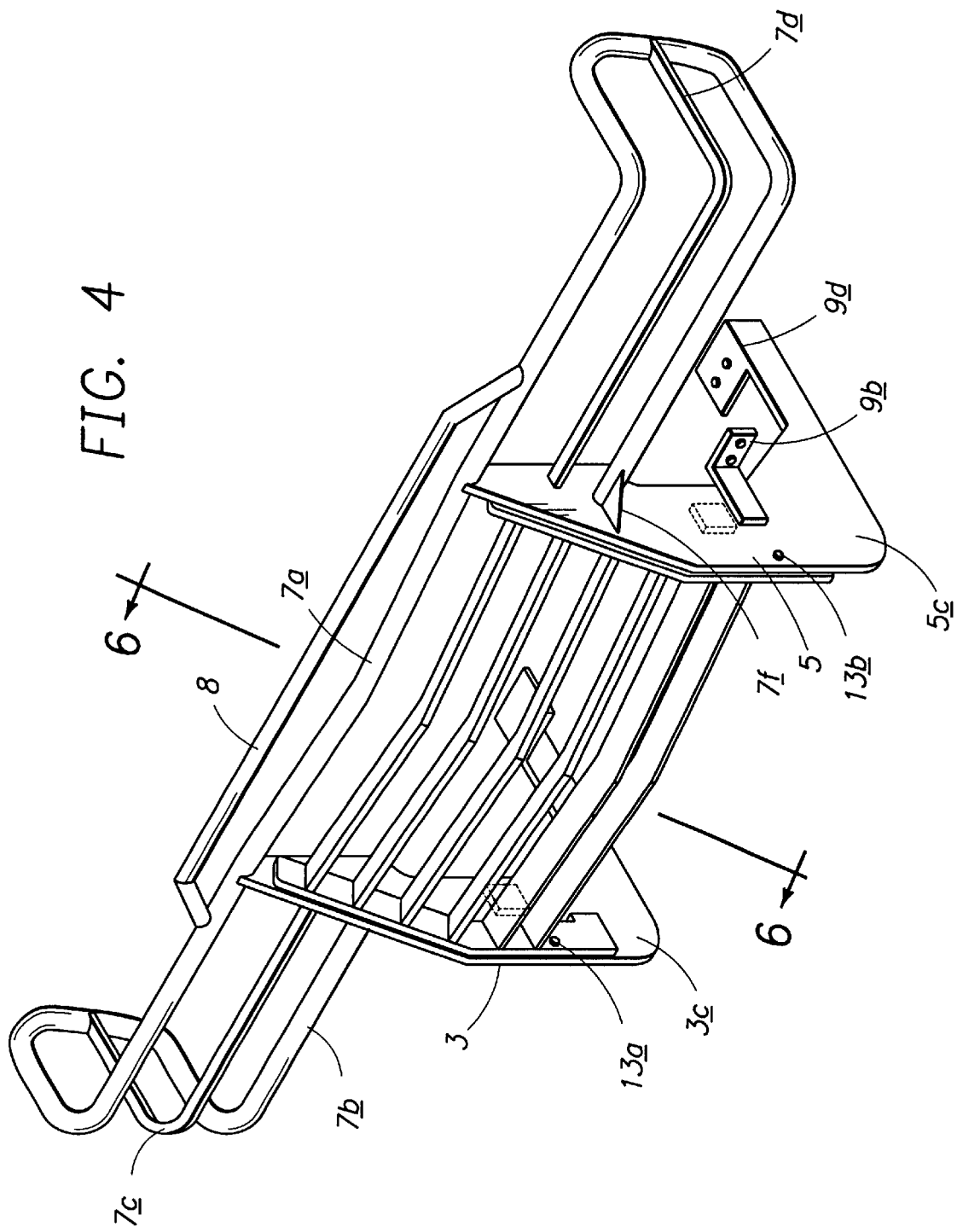
FIG. 4 is a view of the tote rack shown in FIG. 3 with the rack positioned in the non-toting position.
Figure 5:
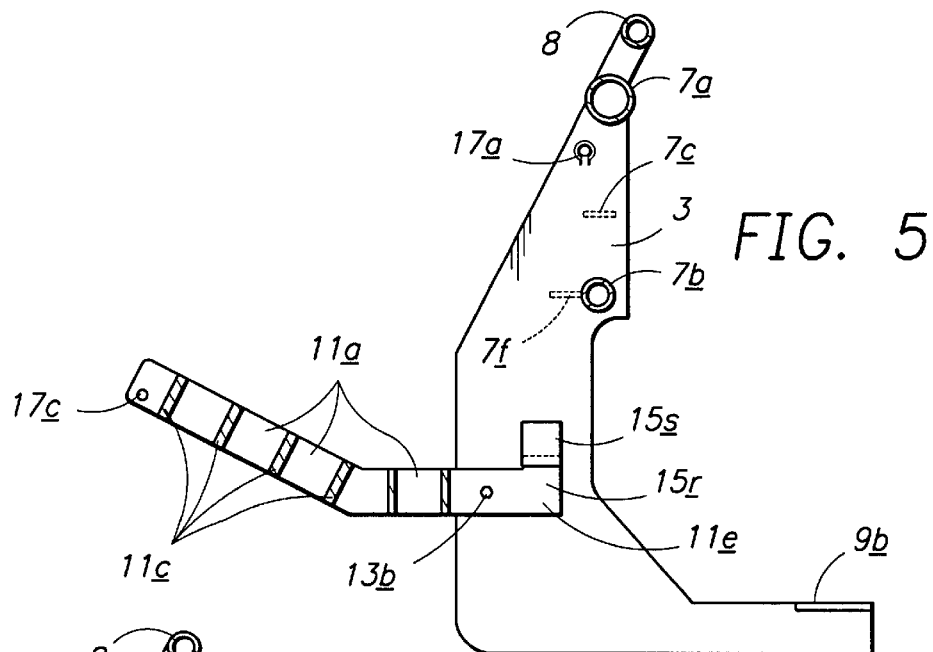
FIG. 5 is a cross-sectional view taken along line 5—5 of FIG. 3.
Figure 6:
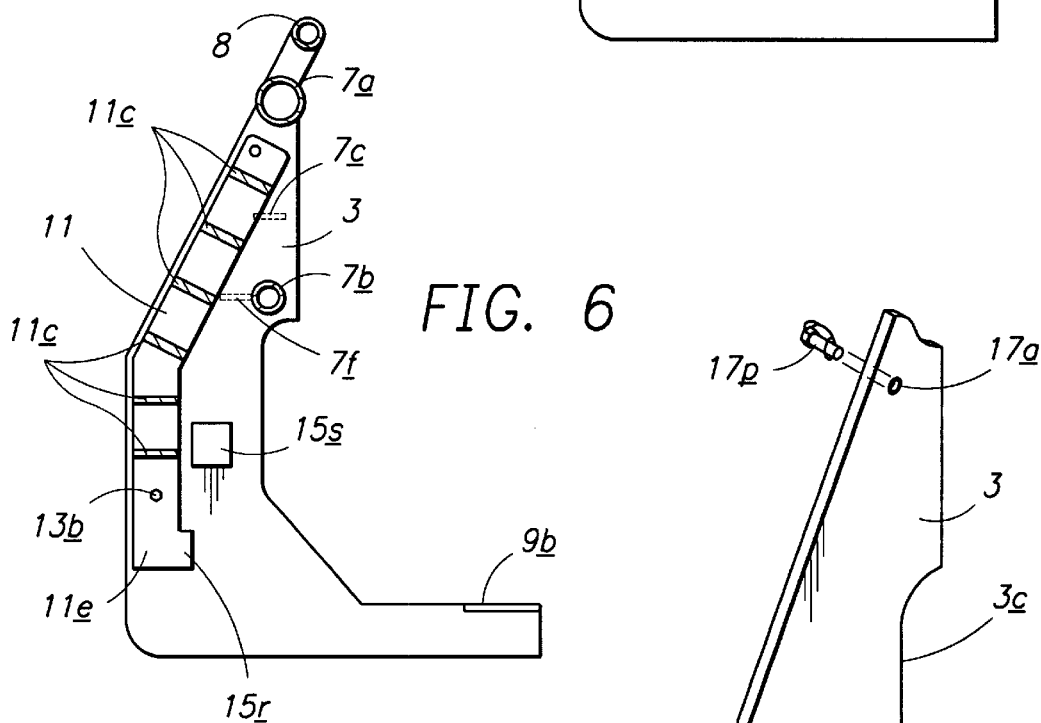
FIG. 6 is a cross-sectional view taken along line 6—6 of FIG. 4.
Figure 7:
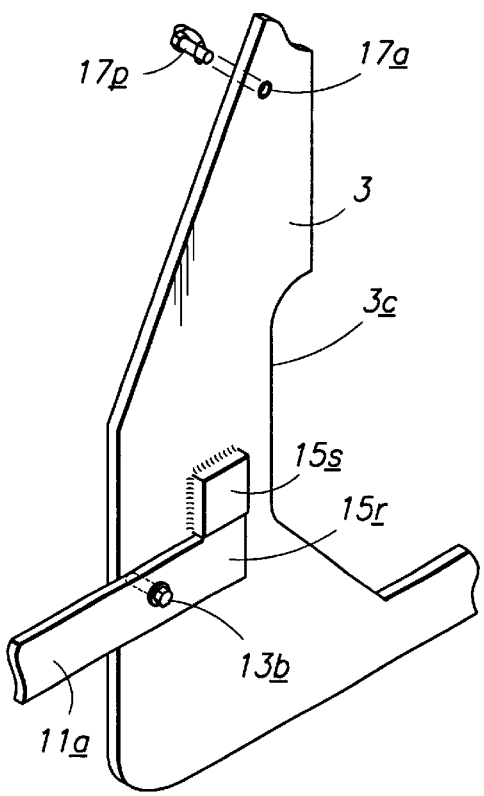
FIG. 7 is an exploded perspective view of line 7—7 of FIG. 3.

A fuller appreciation of the invention may be observed by referring in particular to FIGS. 1–7 which depict various views. The present invention provides a load carrying and brush guard attachment (generally referenced as 1) for protecting a vehicular front end F of a vehicle V (shown in part by the broken lines) even when the attachment 1 is placed in a toting position (as depicted in FIGS. 2, 3 5 & 7) and utilized in the transporting of weighted objects (not shown), said attachment 1 comprising:

a) a pair of vertical support members 3 and 5 respectively having an inwardly disposed contoured surface 3c and 5c for supportively engaging against a vehicular bumper (broken lines) B;

b) a transverse brush rail 7a connectively anchoring and bridging said support members (3 and 5) in a laterally disposed relationship with said brush rail 7 radiating outwardly from the support members 3 and 5 along a contoured protective juxtaposition so as to protectively extend about a peripheral margin of the vehicular front end F in a juxtapositional protective position and thereby protect the vehicular front end F (broken lines) against brush damage;

c) detachable mounting means (generally prefixed by a 9) for mounting support members 3 and 5 to the vehicle V;

d) a tote rack 11 pivotally mounted between the support members by pivotal mounting means (generally prefixed by 13) for positioning the rack 11 in a toting position as shown in FIGS. 2, 3, 5 and 7, and an upright position when not in use for toting the objects as shown in FIGS. 1, 4 and 6;

e) stop means (generally prefixed by 15) for maintaining the tote rack 11 in the toting position as depicted by FIGS. 2–3, 5 and 7; and f) retaining or restraining means (generally designated as 17) for retaining the tote rack 11 in the upright position as shown in FIGS. 1, 4 and 6 for use when said rack 11 is positioned in the non-toting position.

Unlike conventional front-mounted vehicular carriers which often look and function analogous to a drawbridge by a lowering and raising of the entire rack with chains while only contributing nominal brush guard protection when used to tote objects, the present attachment 1 allows more complete protection of a vehicular front end F irrespective of the positioning of the tote rack 11. The brush guard features include a pivotal mounting of rack 11 disposed in the center of attachment 1 and pivotally positioned forward of the brush rail 7. As may be observed from the figures, the support members 3 and 5 and brush rails 7 in cooperative association with rack 11 fully protect the vehicular front end F against brush damage irrespective of the tote gate 11 positioning. As the vehicle V moves through wooded regions, the leading edge of the rack 11 serves to deflect brush downwardly or outwardly while the support members 3 and 5 and brush rail 7 effectively deflect any remaining undeflected brush away from the vehicular front end F.

Brush rail 7 forms a circuitous pathway in a protective juxtaposition to the vehicular front end F. The upper portion of the brush rail 7 is identified in the FIGS. 1–6 as a top rail section 7a while the bottom portion of rail 7 is depicted as bottom rail section 7b all of which are integrated together by side rail portions 7s as a continuous circuitous unit. As illustrated in FIGS. 2–4, the preferred brush rail 7 includes the bottom rail brush section 7b (which may supportively mate onto a vehicular bumper B) and an upper rail section 7a which merge together along side margin rail sites 7s rearward of vehicular bumper B to form a circuitous protective rail 7 of a U-shaped protective configuration extending backwards onto the fender panel P. Conventional steel plating and pipes bent or joined together in the U-shaped configuration as shown in FIGS. 2–4 may be utilized to fabricate brush rail 7. At the junctures of rail section 7b with support members 3 and 5, two flanged braces 7f welded or otherwise secured to support members 3 and 5 serve to help rigidly maintain the support members 3 and 5 in a laterally and vertically disposed relationship which in turn serve to receive and seat the pivotally mounted tote rack 11 therebetween. In the preferred embodiments of the invention, supplemental brush guard rails 7c and 7d are welded to support members 3 and 5 at bisecting positioning between the top rail 7a and bottom rail 7b sections of rail 7 to provide added support and vehicular protection. Brush guard rails 7c and 7d portions positioned outside the rack support members 3 and 5 also afford added structural support and brush protection. The attachment 1 also preferably includes a centrally disposed top rail guard 8 which extends upwardly above rack 11 and the center portion of top rail 7a. Top rail guard 8 provides added protection against any branches or brush unobstructed by the lower attachment components. The top rail guard 8 also protects the vehicular hood and windshield from being damaged by the more elevated branches.

In the preferred embodiments of the invention, pivotally mounted rack 11 is positioned in relation to top rail 7a and bottom rail 7b at a protruding and brush deflecting position. This may be accomplished by mounting rack 11 to mounts 13 which project forwardly from the main planar axis formed by brush rail 7. As may be observed from the drawings, support members 3 and 5 include supportive base regions 3b and 5b which respectively extend downwardly and project outwardly from the anchoring of supports 3 and 5 to top rail 7a and bottom rail 7b so as to provide projecting pivotal mounting sites 13 of adequate clearance from brush rail 7 and for the pivotally mounting rack 11 in a forwardly toting position to support members 3 and 5. This allows rack 11 to freely pivot about mounting sites 13 from a desired toting to an untoting or upright positioning while allowing brush rail 7 to more fully protect the vehicle from damage. As partially shown in FIG. 7, mounting bolt 13b secures rack 11 to support members 3 and 5 while also allowing rack 11 to pivot about its mounting bolts 13b.

Rack 11 is depicted as being comprised of a pair of parallel and angular gate bars 11a and 11b laterally spaced apart and braced by cross bars 11c so as to provide a rack 11 which seats inside of support brackets 3 and 5 when lowering rack 11 to the toting position as shown in FIGS. 2–3, 5 and 7 or raising it to an upright position as shown in FIGS. 1 and 4. Gate bars 11a and 11b include an upwardly and inwardly angular bend Ho distal to mounting means 13 so as to provide a troughed region for effectively carrying and inhibiting a toted object from dislodgment from rack 11. This trough curvature also enhances the brush deflecting efficacy of attachment 1 when placed in either the toting or non-toting position by causing a downwardly deflection of brush.

With particular reference to FIGS. 2–3 and 5–6, it will be observed that rack 11 is preferably constructed so as to provide a cradled relationship when rack 11 is positioned in the toting position. This may be accomplished by fabricating gate bars 11a and 11b in a cradling configuration so that a proximate leg portion 11w of bars 11a and 1 b and a distal leg portion 11L of gate bars 11a and 11b are positioned in an acute angular relationship to one another when viewed along the major planar axis of the gate bars as depicted in particular by FIGS. 2–3 and 5.

A series of cross bars 11c bridging between gate bars 11a and 11b provide structural support to gate 11 while also providing a suitable weight bearing grate for toting game and the like. The contour of rack 11 compliments the protective character plane formed by brush rail 7 and support members 3 and 5.

Gate bars 11a and 11b are pivotally mounted onto the support members 3 and 5 by pivotal mount 13 (e.g., bolt or pin) at a recessed margin and extended so as to provide an extending gate bar margin or gate bar extension 11e along the base of gate bars 11a and 11b. A projecting stop rest 15r may be suitably welded onto each gate bar base 11e so as to extend the gate bar rest 15r inwardly toward the front end F when rack 11 is positioned in an upright position or upwardly when the gate 11 is pivoted to the toting position. A pair of stops 15s are welded onto the inside face or interiorly anchored directly onto interfacing sides of support bars 3 and 5 at a stop position so that when rack 11 is pivoted in a downward position both stop rests 15r of gates 11a and 11b will rest against stops 15s and prevent any further downward movement of rack 11.

In the preferred embodiments of the invention, the attachment 1 is provided with mounting brackets 9a, 9b, 9c and 9d which are adapted to bolt attachment 1 to the vehicular frame (not shown) of vehicle V. When secured to a vehicular frame, the brush guard attachment 1 maintains a rigid and protective position. As may be observed, the attachment 1 is constructed of sufficiently durable components (e.g. steel stock) so as to allow its use in toting heavily weighted objects. The brush guard assembly 1 may be easily mounted or dismounted from the vehicle V.

The attachment 1 is also suitably equipped with retaining or restraining means (generally designated as 17) for restraining the tote rack in the upright position. The restraining means 17 for restraining the rack 11 in the upright position may comprise latching means 17 for latching rack 11 to support members 3 and 5 such as latching pins 17p and latching apertures 17a and 17b. The restraining means 17, as more specifically illustrated in the figures, includes gate retaining apertures 17a and 17b as shown in FIGS. 2–3, 5 and 7 or drill holes drilled through the support members 3 and 5 and matching apertures 17c and 17d correspondly positioned to the upper portion of the gate bars 11a and 11b. As depicted in particular by FIGS. 1–4 and 6, matching apertures 17c and 17d register onto retaining apertures 17a and 17b when rack 11 is closed. When the tote rack 11 is placed in an upright position as illustrated in FIGS. 1–4 and 6, retaining pins 17p latch the gate bars 11a and 11b to support members 3 and 5 and thus maintain rack 11 in its upright position. Simply by removing the retaining pins 17p, rack 11 will then be pivotally and gravitationally repositioned to the toting position. The fulcrum point or pivotal point of the mounting means 11, in cooperation with the weight of rack 11, provides sufficient gravitational force to maintain gate 11 in the toting position as illustrated in FIGS. 2–3, 5 and 7.

When the tote rack 11 is not utilized for toting, the tote rack 11 may be conveniently placed in the upright position and secured by the retaining means 17. When it is desired to utilize the tote gate 11, the retaining pins 17p may be simply removed from their retaining positions and the tote gate 11 is allowed to drop onto its gravitational rest against stops 15s so as to permit its use in an appropriate toting position.

The design and configuration of brush rail 7 and rack 11 facilitate the brushing of brush away from the vehicle V. The upwardly bend of rack 11 when placed in the toting position deflects brush downwardly and away from the grill.

What is claimed is:

1. A brush guard for protecting a vehicular front end of a vehicle and equipped to tote weighted objects when positioned in a toting position with the guard also affording vehicular front end protection when placed in either an upright protective position or the toting position, said brush guard comprising:

a) a pair of centrally disposed and projecting vertical support members respectively having a contoured inner surface for supportively engaging a vehicular bumper and a projecting base for extending the support members outwardly from the bumper;

b) a protective brush rail unit supportively braced onto said support members and connecting said support members together with said protective brush rail unit peripherally extending about the front end of the vehicle so as to protect the front end of the vehicle from brush damage;

c) detachable mounting means anchored onto the support member for mounting the vertical support members to the vehicle;

d) a tote rack positioned forwardly of the protective brush rail unit and pivotally mounted between the support members;

e) stop means for maintaining the tote rack in the toting position; and f) restraining means for restraining the tote rack in the upright position.

2. The brush guard according to claim 1 wherein the protective brush rail unit includes a top rail section and bottom rail section rigidly secured to the support members with the top rail section and the bottom rail section being interconnected together by downwardly extending side rail sections at opposite ends of the top rail section.

3. The brush guard according to claim 1 wherein the rack comprises a pair of parallel gate bars seated between the members and laterally spaced apart and braced by cross bars bridging between the bars so as to provide the rack.

4. The brush guard according to claim 3 wherein each of the gate bars comprises a unitary piece having a proximate leg section and a distal leg section disposed at an acute angular disposition so as to provide a cradled rack when the rack is positioned in the toting position.

5. The brush guard according to claim 4 wherein the proximate leg section includes a pivotal mounting site for pivotally mounting the bars to the members.

6. The brush guard according to claim 5 wherein the proximate end section includes a stop rest for stopping the rack in the toting position when the stop rest is positioned against a stopping brace anchored to the support member in registering position.

7. The device according to claim 6 wherein the restraining means for restraining the rack in the upright position comprises latching means for latching the rack to the support members.

8. The device according to claim 7 wherein the latching means comprises latching pins and latching apertures for securing the latching pins therewithin.

9. A load carrying and brush guard attachment for mounting to a vehicle and protecting a vehicular front end of the vehicle while transporting weighted objects therewith, said attachment comprising:

a) a pair of vertical support members respectively equipped with contoured inner surface for supportively engaging against a vehicular bumper with said vertical support members including a protruding base section for extending the base section outwardly from said bumper when said attachment is mounted to the vehicle;

b) a protective brush rail connectively supporting and bracing together said support members in a lateral relationship with said brass rail being of a shaped contour so as to protectively extend about a peripheral margin of the vehicular front end in a protective position so as to protect the front end against brush damage;

c) detachable mounting means for mounting the support members to the vehicle in a vertical support position;

d) a tote rack pivotally mounted between the support members and disposed in a forwardly relationship to said protective rail;

e) stop means for maintaining the tote rack in a toting position; and f) retaining means for retaining the tote rack in the upright position when said rack is positioned in a non-toting position.

10. The attachment according to claim 9 where in the vertical support members are centrally disposed within the attachment.

11. The attachment according to claim 10 wherein the tote rack includes a pair of gate bars comprised of a proximate leg section and distal leg section disposed at an acute angular disposition so as to provide a cradled rack for toting objects therewith and deflecting brush therewith when said rack is positioned in the toting position.

\* \* \* \* \*